US012744746B2

(12) United States Patent
Broussard et al.

(10) Patent No.: US 12,744,746 B2
(45) Date of Patent: Sep. 22, 2026

(54) LOAD DISTRIBUTION ACROSS MESH NETWORKS

(71) Applicant: Advanced Micro Devices, Inc., Santa Clara, CA (US)

(72) Inventors: Bryan P. Broussard, Austin, TX (US); Chintan S. Patel, Austin, TX (US); Eric Christopher Morton, Austin, TX (US); Jeffrey Lynn Freeman, Austin, TX (US); Vydhyanathan Kalyanasundharam, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 428 days.

(21) Appl. No.: 18/345,957

(22) Filed: Jun. 30, 2023

(65) Prior Publication Data

US 2025/0007861 A1 Jan. 2, 2025

(51) Int. Cl.
*H04L 49/25* (2022.01)

(52) U.S. Cl.
CPC .................................... *H04L 49/25* (2013.01)

(58) Field of Classification Search
CPC ......... H04L 49/15; H04L 49/25; H04L 49/35; H04L 49/357; G06F 13/00; G06F 13/42
See application file for complete search history.

(56) References Cited

U.S. PATENT DOCUMENTS 7,583,677 B1 * 9/2009 Ma .......................... H04L 45/24 370/235
2003/0165137 A1 * 9/2003 Soloway ............... H04L 49/357 370/386
2008/0151894 A1 * 6/2008 Maiyuran .............. H04L 45/60 370/392
2017/0195259 A1 * 7/2017 Florea ................... H04L 47/726
2020/0125503 A1 * 4/2020 Graniello ................ G06F 3/061

FOREIGN PATENT DOCUMENTS

CN 113783806 B * 10/2023 ............. H04L 49/25

* cited by examiner

*Primary Examiner* — Mohamed A Kamara
(74) *Attorney, Agent, or Firm* — Greenberg Traurig, LLP

(57) ABSTRACT

The disclosed device includes memory channel interfaces and mesh lanes each corresponding to a particular memory channel interface. The device also includes ports and various routing elements interconnecting the ports, mesh lanes, memory channel interfaces. The device further includes a control circuit configured to receive a data packet on a port, select a mesh lane based on a destination of the data packet, and forward the data packet to the selected mesh lane via a routing element. Various other methods, systems, and computer-readable media are also disclosed.

20 Claims, 4 Drawing Sheets

LOAD DISTRIBUTION ACROSS MESH NETWORKS

BACKGROUND

In computing device architectures having multiple dies or sockets (e.g., a multi-chiplet architecture), a data fabric can be used for sending data between die components. The data fabric can support sending data packets across a socket or die (e.g., from a component at one end of the die to another component at an opposite end of the die). Such a fabric can be organized as a mesh, and interfaces that cross this mesh can form a "lane" (e.g., mesh lane). The mesh lanes often correspond to memory channels such that data packets from a memory channel can be routed through the corresponding mesh lane. Data packets originating outside of a memory channel or the die can be sent across the die via a mesh lane. However, such routing often uses only a default mesh lane, creating a bottleneck at that default mesh lane.

BRIEF DESCRIPTION OF THE DRAWINGS

The accompanying drawings illustrate a number of exemplary implementations and are a part of the specification. Together with the following description, these drawings demonstrate and explain various principles of the present disclosure.

Figure 1:
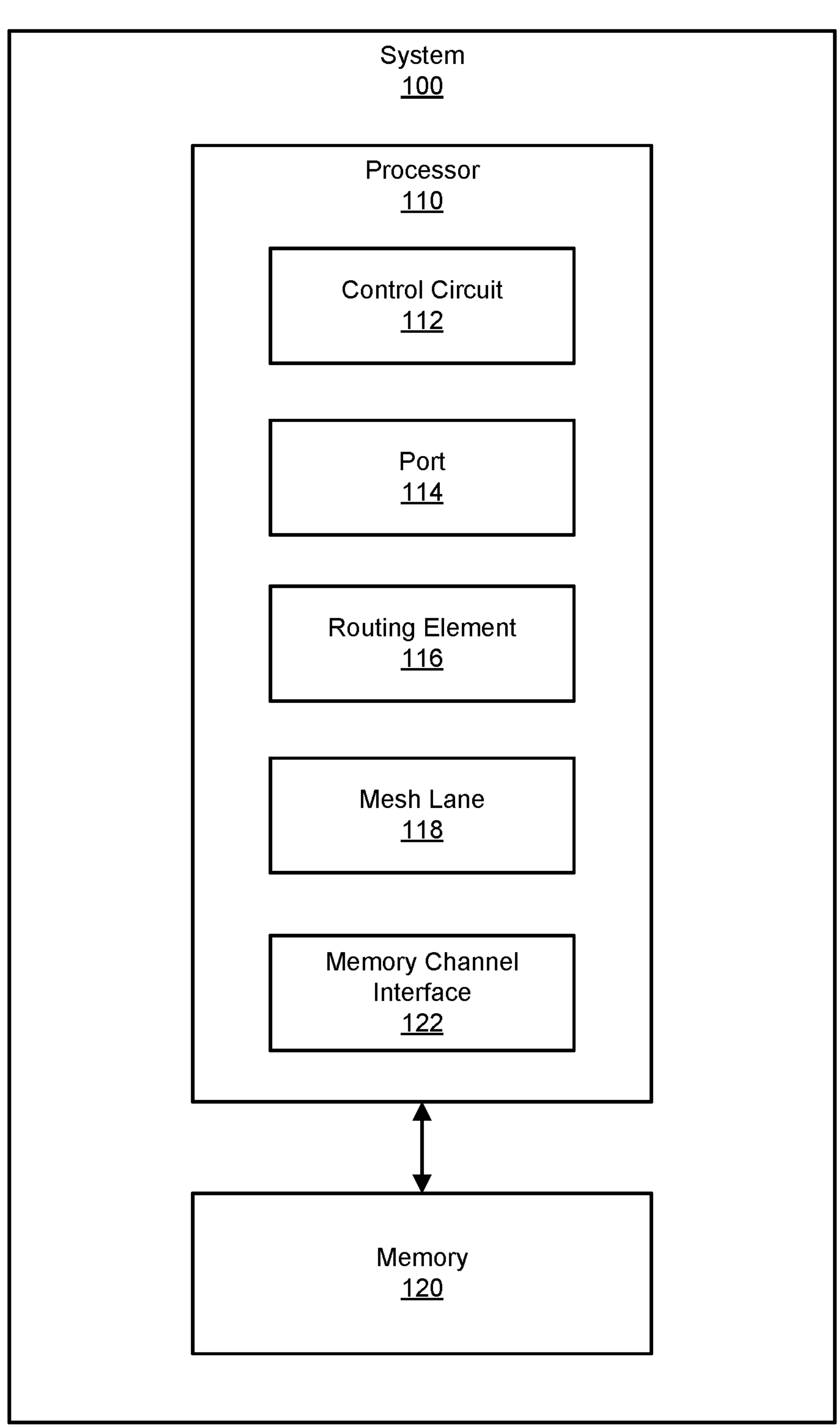
FIG. 1 is a block diagram of an exemplary system for load distribution across mesh networks.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the present disclosure covers all modifications, equivalents, and alternatives falling within the scope of the appended claims.

DETAILED DESCRIPTION

The present disclosure is generally directed to load distribution across mesh networks. As will be explained in greater detail below, implementations of the present disclosure apply an inter-die routing scheme for data traffic outside of a die, and apply an intra-die routing scheme for data within the die. More specifically, data packets sent across the die can be routed through a mesh lane based on various routing factors (e.g., address or tag hash, memory controller location, available bandwidth, etc.) to better distribute data traffic across the mesh lanes rather than using a single default mesh lane, to mitigate bandwidth bottlenecks from using the single default mesh lane, which further provides improved computing performance and reduced heat generation and wear at a single mesh lane.

In one implementation, a device for load distribution across mesh networks includes a plurality of mesh lanes each corresponding to a memory channel interface. The device also includes a control circuit configured to (i) receive a data packet, (ii) select a mesh lane of the plurality of mesh lanes based on an attribute of the data packet, (iii) and forward the data packet to the selected mesh lane.

In some examples, the device can include a plurality of ports, and a plurality of routing elements interconnecting the plurality of ports, the plurality of mesh lanes, and the plurality of memory channel interfaces. In some examples, a source of the data packet is outside of the device and a destination of the data packet is outside of the device. In some examples, the selected mesh lane is selected based on a bandwidth availability of the selected mesh lane. In some examples, the data packet was forwarded to the port based on an inter-device routing scheme. In some examples, the data packet is forwarded along the mesh lane to a second port of the plurality of ports. In some examples, at the second port an inter-device routing scheme is applied to the data packet.

In some examples, a source of the received data packet is within the device. In some examples, the selected mesh lane is selected based on a closest mesh lane to the source.

In some examples, a destination of the data packet is within the device. In some examples, the selected mesh lane is selected based on a closest mesh lane to the destination In one implementation, a system for load distribution across mesh networks includes a first die including a first plurality of memory channel interfaces, a first plurality of mesh lanes each corresponding to a particular memory channel interface of the first plurality of memory channel interfaces, a first plurality of ports, and a first plurality of routing elements interconnecting the first plurality of ports, the first plurality of mesh lanes, and the first plurality of memory channel interfaces. The system further includes a second die including a second plurality of memory channel interfaces, a second plurality of mesh lanes each corresponding to a particular memory channel interface of the first plurality of memory channel interfaces, a second plurality of ports, and a second plurality of routing elements interconnecting the first plurality of ports, the first plurality of mesh lanes, and the first plurality of memory channel interfaces. The system also includes a control circuit configured to apply an inter-die routing scheme for data traffic outside the first die and the second die, and apply an intra-die routing scheme for data traffic within the first die or the second die.

In some examples, the first die can include a first plurality of ports, and a first plurality of routing elements interconnecting the first plurality of ports, the first plurality of mesh lanes, and the memory channel interfaces. In some examples, the second die can include a second plurality of ports, and a second plurality of routing elements interconnecting the second plurality of ports, the second plurality of mesh lanes, and the memory channel interfaces.

In some examples, the control circuit is configured to apply the intra-die routing scheme for the first die by (i) receiving, on a port of the first plurality of ports, a data packet, (ii) selecting a mesh lane of the first plurality of mesh lanes based on an attribute of the data packet, and (iii) forwarding the data packet to the selected mesh lane via one or more of the first plurality of routing elements.

In some examples, a source of the data packet is outside of the first die, a destination of the data packet is the second die, and the selected mesh lane is selected based on the source or the destination. In some examples, the data packet is forwarded along the mesh lane to a second port of the first plurality of ports and further forwarded to a third port of the second plurality of ports.

In some examples, the data packet is received at the port based on the inter-die routing scheme. In some examples, a source of the received data packet is within the first die and the selected mesh lane is selected based on a closest mesh lane to the source. In some examples, a destination of the received data packet is within the first die and the selected mesh lane is selected based on a closest mesh lane to the destination.

In one implementation, a method for load distribution across mesh networks includes (i) determining, from an attribute of a data packet, a destination for the data packet to be sent across a die, (ii) applying an intra-die routing scheme to select, based at least on the destination, a mesh lane of the die for sending the data packet across the die, and (iii) forwarding the data packet to the selected mesh lane using at least one routing element of the die.

In some examples, applying the intra-die routing scheme further comprises selecting the mesh lane based on a bandwidth availability of the selected mesh lane for the destination being outside of the die. In some examples, the method further includes applying an inter-die routing scheme to the data packet outside of the die.

Features from any of the implementations described herein can be used in combination with one another in accordance with the general principles described herein. These and other implementations, features, and advantages will be more fully understood upon reading the following detailed description in conjunction with the accompanying drawings and claims.

The following will provide, with reference to FIGS. 1-4, detailed descriptions of load distribution across mesh networks. Detailed descriptions of example systems and circuits for mesh networks incorporating load distribution will be provided in connection with FIGS. 1 and 2. Detailed descriptions of corresponding methods will also be provided in connection with FIGS. 3 and 4.

FIG. 1 is a block diagram of an example system 100 for load distribution across mesh networks. System 100 corresponds to a computing device, such as a desktop computer, a laptop computer, a server, a tablet device, a mobile device, a smartphone, a wearable device, an augmented reality device, a virtual reality device, a network device, and/or an electronic device. As illustrated in FIG. 1, system 100 includes one or more memory devices, such as memory 120. Memory 120 generally represents any type or form of volatile or non-volatile storage device or medium capable of storing data and/or computer-readable instructions. Examples of memory 120 include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, and/or any other suitable storage memory.

As illustrated in FIG. 1, example system 100 includes one or more physical processors, such as processor 110. Processor 110 generally represents any type or form of hardware-implemented processing unit capable of interpreting and/or executing computer-readable instructions. In some examples, processor 110 accesses and/or modifies data and/or instructions stored in memory 120. Examples of processor 110 include, without limitation, chiplets (e.g., smaller and in some examples more specialized processing units that can coordinate as a single chip), microprocessors, microcontrollers, Central Processing Units (CPUs), graphics processing units (GPUs), Field-Programmable Gate Arrays (FPGAs) that implement softcore processors, Application-Specific Integrated Circuits (ASICs), systems on chip (SoCs), digital signal processors (DSPs), Neural Network Engines (NNEs), accelerators, graphics processing units (GPUs), portions of one or more of the same, variations or combinations of one or more of the same, and/or any other suitable physical processor.

As further illustrated in FIG. 1, processor 110 includes a control circuit 112, a port 114, a routing element 116, a mesh lane 118, and a memory channel interface 122. Control circuit 112 corresponds to circuitry and/or instructions for applying routing schemes for data packets sent across a data fabric that includes, for instance, port 114, routing element 116, mesh lane 118, and memory channel interface 122. In some examples, control circuit 112 can modify metadata and/or other routing signals of a given data packet (e.g., hash bits of a tag) to apply a routing scheme, although in other examples, control circuit 112 can signal or control the various components of the data fabric.

Port 114 generally corresponds to a data port for sending and/or receiving data packets to/from components of system 100 and, in some examples, components that can be external to processor 110 (e.g., off die). Although FIG. 1 illustrates a single port 114 for simplicity, in other examples processor 110 and/or system 100 can include multiple iterations of port 114 of different types.

Routing element 116 generally corresponds to circuitry for receiving data packets and forwarding the data packets along a specific path in accordance with the applied routing scheme. For example, routing element 116 can send the data packets to a path indicated by metadata and/or other routing signals of respective data packets, although in other examples, routing element 116 can receive control signals (e.g., from control circuit 112). Although FIG. 1 illustrates a single routing element 116 for simplicity, in other examples processor 110 and/or system 100 can include multiple iterations of routing element 116 of different types.

Mesh lane 118 generally corresponds to circuitry for sending data packets, and in some examples send data packets across a die (e.g., processor 110), such as across one chiplet to reach another chiplet. In some implementations, mesh lane 118 corresponds to a particular memory channel (e.g., memory channel interface 122) such that data packets from/to the memory channel can be routed through mesh lane 118. In some examples, each data packet can have one or more attributes that can indicate a source and/or destination. Although FIG. 1 illustrates a single mesh lane 118 for simplicity, in other examples processor 110 and/or system 100 can include multiple iterations of mesh lane 118 of different types.

Memory channel interface 122 generally corresponds to circuitry for sending/receiving data packets to/from a memory channel of a memory device such as memory 120. Although FIG. 1 illustrates a single memory channel interface 122 for simplicity, in other examples processor 110 and/or system 100 can include multiple iterations of memory channel interface 122 of different types. As multiple memory channels allow sending/receiving data to/from multiple portions of memory 120, each memory channel can have a corresponding iteration of memory channel interface 122 and mesh lane 118.

Figure 2:
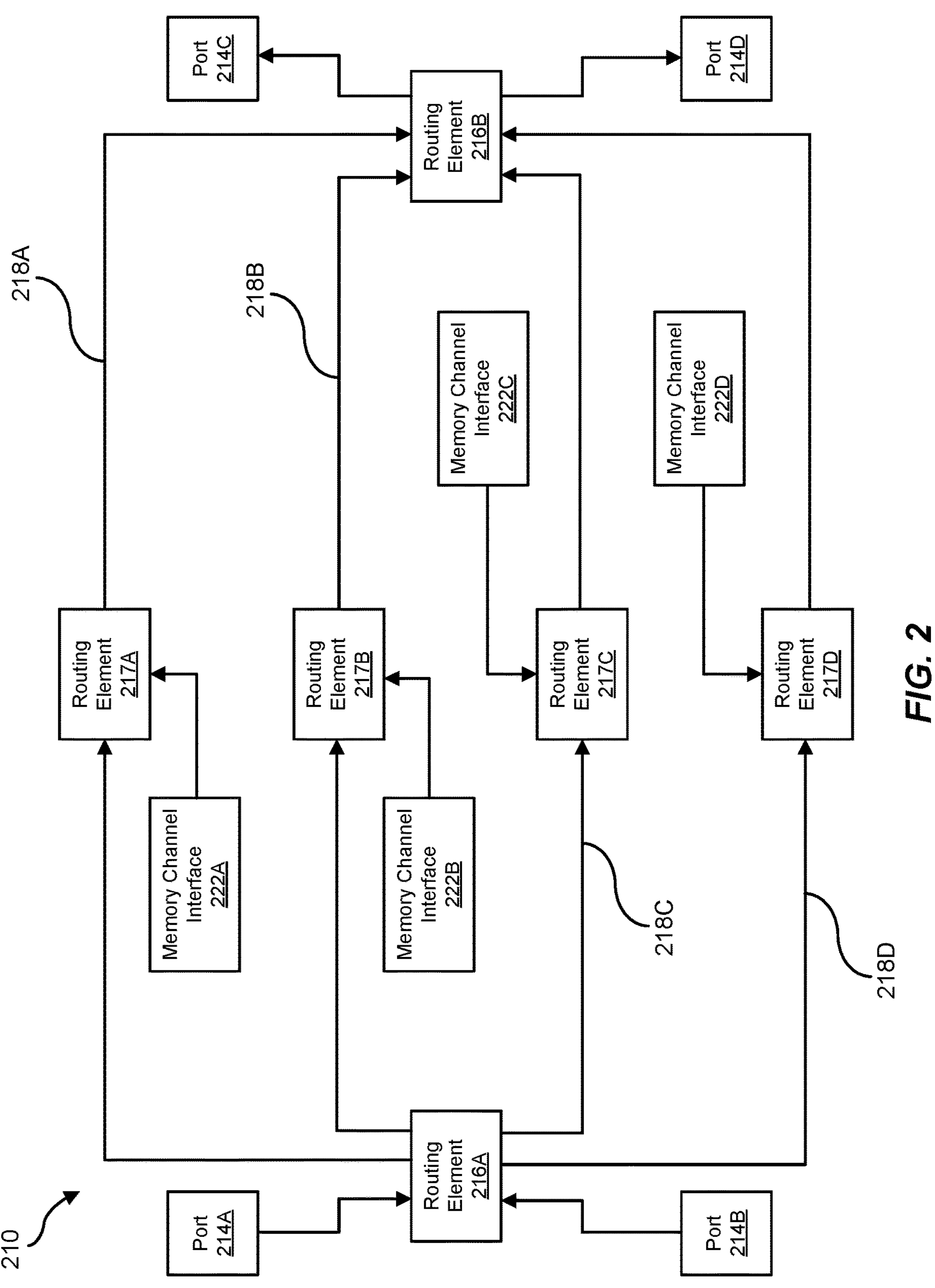
FIG. 2 is a block diagram of an exemplary mesh network incorporating load distribution.

FIG. 2 illustrates a die 210 corresponding to an iteration of processor 110. As illustrated in FIG. 2, die 210 includes a port 214A, a port 214B, a port 214C, and a port 214D, each corresponding to iterations of port 114. Die 210 also includes a routing element 216A, a routing element 216B, a routing element 217A, a routing element 217B, a routing element 217C, and a routing element 217D, each corresponding to iterations of routing element 116. Die 210 further includes a mesh lane 218A, a mesh lane 218B, a mesh lane 218C, and a mesh lane 218D, each corresponding to iterations of mesh lane 118. In addition, die 210 includes a memory channel interface 222A, a memory channel interface 222B, a memory channel interface 222C, and a memory channel interface 222D, each corresponding to iterations of memory channel interface 122.

As illustrated in FIG. 2, each mesh lane (which in some examples can extend from routing element 216A to routing element 216B) corresponds to a memory channel. For instance, mesh lane 218A corresponds to memory channel interface 222A (and its associated memory channel) such that data packets from memory channel interface 222A are routed to mesh lane 218A via routing element 217A. Similarly, mesh lane 218B corresponds to memory channel interface 222B, mesh lane 218C corresponds to memory channel interface 222C, and mesh lane 218D corresponds to memory channel interface 222D. Thus, data packets originating from or sent to a memory channel can be routed through the corresponding mesh lane, which can be the closest mesh lane to the source or destination.

In some examples, data packets can be sent across die 210 (e.g., from the left to the right). Although FIG. 2 and the examples herein describe data packets generally sent from the left to the right of die 210 (e.g., as further indicated by the illustrated arrows to illustrate more clearly possible routes), in other examples, data packets can be sent from the right to the left or along other appropriate paths/directions even if not indicated by arrows. Data packets can be sent across die 210 for instance when a data packet originating outside of die 210 is received on a port, such as port 214A or port 214B, to be routed across die 210 to port 214C or port 214D, which can then be sent to a destination outside of die 210. Data traffic from outside of die 210 can be routed through die 210, using an inter-die routing scheme, to destinations outside of die 210. For instance, a data packet received at port 214A can be forwarded to routing element 216A. Routing element 216A can have a routing table corresponding to the inter-die routing scheme. Based on the destination outside of die 210, routing element 216A can forward the data packet along mesh lane 218A by default, to send the data packet to port 214C (which can be selected by routing element 216B based on the destination). However, as described above, selecting the default mesh lane can create a bottleneck.

The systems and methods described herein can apply an intra-die routing scheme for data traffic within die 210. In the above example, after receiving the data packet on port 214A and forwarded to routing element 216A, routing element 216A (and/or a control circuit such as control circuit 112) can select one of mesh lanes 218A-218D based on the destination. For destinations within die 210, the closest mesh lane to the destination can be selected. For destinations outside of die 210, the mesh lane can be selected based on various factors, such as packet attribute (e.g., an address hash for requests, a tag hash for responses), bandwidth availability (e.g., to favor mesh lanes having more available bandwidth), recency of use, whether the data packet requires ordering (e.g., to favor the same mesh lane used for the previous ordered packet), etc. Once a mesh lane is selected, such as mesh lane 218B, routing element 216A can forward the data packet to mesh lane 218B, which can include sending the data packet through routing element 217B. Once the data packet is sent through mesh lane 218B to routing element 216B, routing element 216B can select the appropriate port (e.g., applying the inter-die routing scheme) to forward the data packet along the port, such as port 214D. The data packet can then be received on another port (e.g., of another die or destination die). Accordingly, the intra-die routing scheme can distribute load across mesh lanes 218A-218D.

Although FIG. 2 illustrates a simplified example, in other implementations die 210 can include more iterations and configurations of the above-mentioned features, such as additional mesh lanes. Moreover, FIG. 2 illustrates a single die. In other examples, a multi-chiplet architecture can include multiple dies. For example, a second die placed to the right of die 210 can interface with die 210 via port 214C and/or port 214D (e.g., connecting to a port 214A and/or port 214B of a second iteration of die 210). The inter-die routing scheme can be applied for routing data packets to a particular die, and the intra-die routing scheme can be applied for routing data packets (e.g., via selecting mesh lanes) within/through the die.

Figure 3:
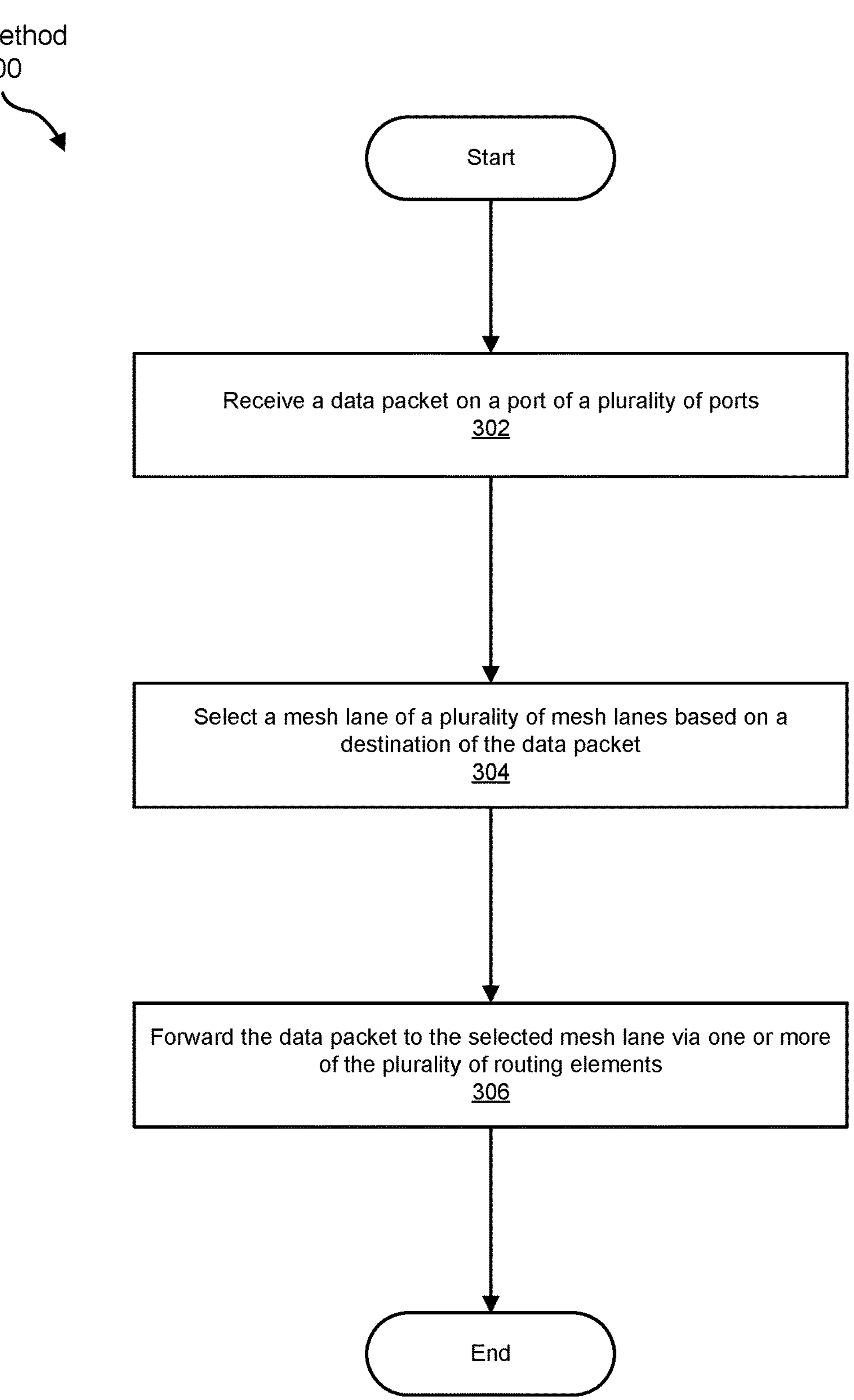
FIG. 3 is a flow diagram of an exemplary method for load distribution across mesh networks.

FIG. 3 is a flow diagram of an exemplary method 300 for load distribution across mesh networks. The steps shown in FIG. 3 can be performed by any suitable circuit, device, and/or system including the system(s) illustrated in FIGS. 1 and/or 2. In one example, each of the steps shown in FIG. 3 represent an algorithm whose structure includes and/or is represented by multiple sub-steps, examples of which will be provided in greater detail below.

As illustrated in FIG. 3, at step 302 one or more of the systems described herein receive, on a port of a plurality of ports, a data packet. For example, a data packet can be received on port 114.

The systems described herein can perform step 302 in a variety of ways. In one example, a source of the data packet is outside of the device (e.g., processor 110) and the destination is outside of the device. For instance, the data packet was forwarded to the port (e.g., port 114) based on an inter-device routing scheme. In another example, a source of the received data packet is within the device.

At step 304 one or more of the systems described herein select a mesh lane of a plurality of mesh lanes based on a destination of the data packet. For example, control circuit 112 can select mesh lane 118 based, in part, on a destination of the data packet.

The systems described herein can perform step 304 in a variety of ways. In one example, when the destination is outside of processor 110, the selected mesh lane (e.g., mesh lane 118) can be selected based on one or more lane select policies such as an attribute of the data packet (e.g., an address hash for requests, a tag hash for responses), a bandwidth availability (e.g., having the most available or having available bandwidth) of the selected mesh lane, etc. In other examples, the selected mesh lane can be selected based on a closest mesh lane to the source when the source is within processor 110. In yet other examples, the selected mesh lane can be selected based on a closest mesh lane to the destination when the destination is within processor 110.

At step 306 one or more of the systems described herein forward the data packet to the selected mesh lane via one or more of a plurality of routing elements. For example, the data packet can be forwarded to mesh lane 118 via routing element 116.

The systems described herein can perform step 306 in a variety of ways. In one example, the data packet is forwarded along the mesh lane (e.g., mesh lane 118) to a second port of the plurality of ports. In some examples, at the second port, an inter-device routing scheme can be applied to the data packet.

Figure 4:
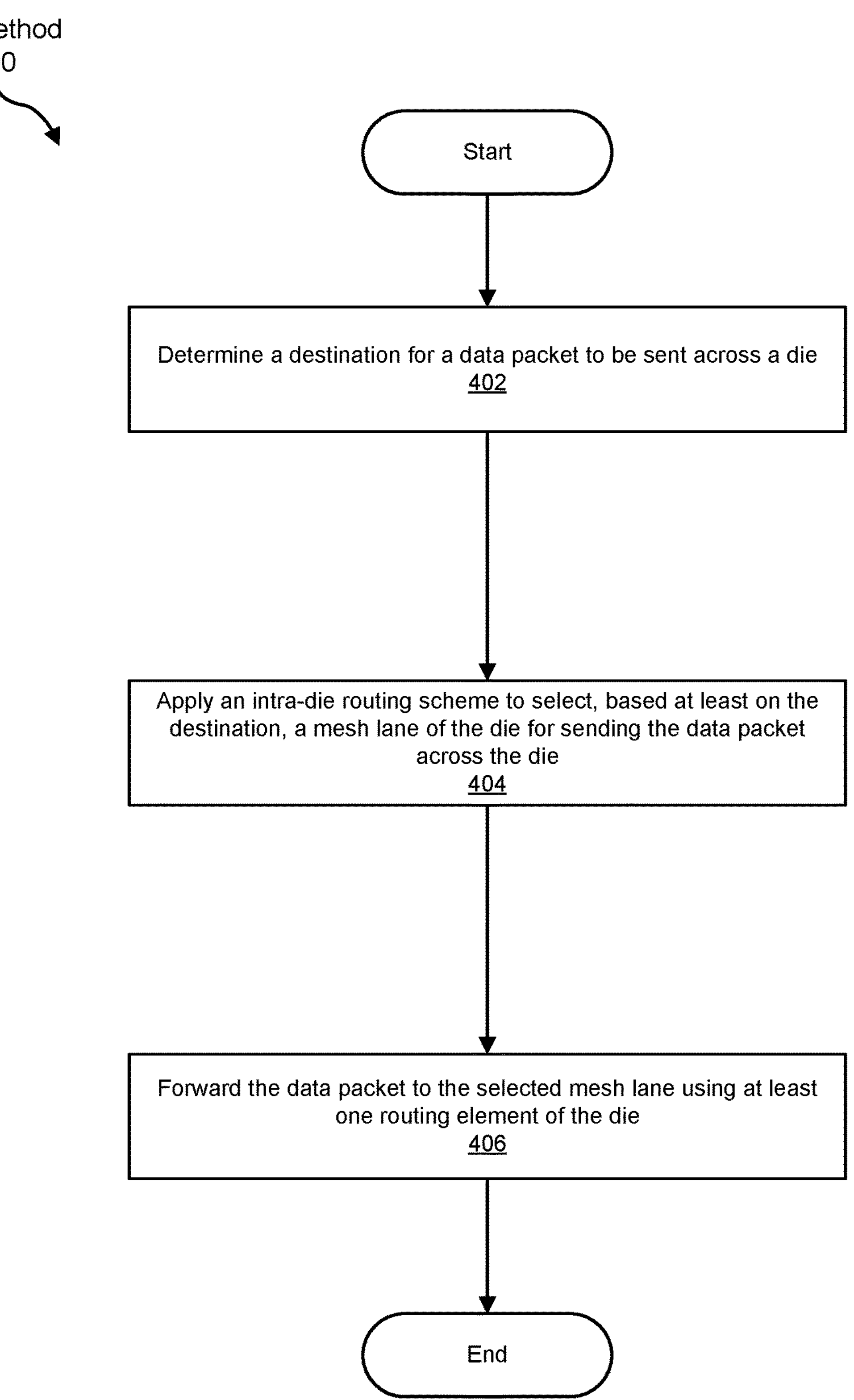
FIG. 4 is a flow diagram of another exemplary method for load distribution across mesh networks.

FIG. 4 is a flow diagram of an exemplary method 400 for load distribution across mesh networks. The steps shown in FIG. 4 can be performed by any suitable circuit, device, and/or system including the system(s) illustrated in FIGS. 1 and/or 2. In one example, each of the steps shown in FIG. 4 represent an algorithm whose structure includes and/or is represented by multiple sub-steps, examples of which will be provided in greater detail below.

As illustrated in FIG. 4, at step 402 one or more of the systems described herein determine a destination for a data packet to be sent across a die. For example, control circuit 112 can determine a destination for a data packet to be sent across a die such as processor 110 and/or die 210.

At step 404 one or more of the systems described herein apply an intra-die routing scheme to select, based at least on the destination, a mesh lane of the die for sending the data packet across the die. For example, control circuit 112 can apply an intra-die routing scheme to select mesh lane 118 based in part on the destination.

The systems described herein can perform step 404 in a variety of ways. In one example, applying the intra-die routing scheme can include selecting the mesh lane (e.g., mesh lane 118) based on a bandwidth availability of the selected mesh lane for the destination being outside of the die (e.g., outside of processor 110). Although in some implementations the bandwidth availability can be monitored, in other implementations, the bandwidth availability can be passively determined and/or established based on using a lane select policy that does not default to one or more specific mesh lanes.

At step 406 one or more of the systems described herein forward the data packet to the selected mesh lane using at least one routing element of the die. For example, the data packet can be forwarded to mesh lane 118 using routing element 116.

The systems described herein can perform step 406 in a variety of ways. In one example, an inter-die routing scheme can be applied to the data packet outside of the die.

As detailed above, in a data fabric for multiple cores, traffic across mesh lanes (e.g., traffic crossing sockets) have stringent requirements, such as not dropping any packet and not reordering packets. A traffic routing scheme can use a global routing table that provides routes for a given source and destination. Traffic originating along a mesh lane can utilize the corresponding mesh lane. However, the global routing table often defaults to a particular mesh lane for routing traffic originating outside of a mesh lane. Thus, the default mesh lane is selected even if other mesh lanes have low traffic, creating a bottleneck with the default mesh lane. The systems and methods described herein provide a tiered routing scheme which, can change routing schemes for the various levels of traffic, for example having a mesh lane routing that routes traffic reaching the mesh (e.g., mesh lane level) to better distribute loads across the mesh lanes.

Packets include metadata such as a source and destination. For traffic originating outside of the mesh lane level, a global routing scheme can be used to route the traffic to the mesh lane level. Once the traffic reaches the mesh lane level, a mesh lane selection policy routes traffic across the mesh lanes, for example based on destination and/or source, to better distribute mesh lane traffic across all available mesh lanes. Once the traffic exits the mesh lane level, an appropriate routing scheme, such as a local scheme, can complete the routing of the traffic. This provides a granular routing mechanism that can route traffic that reaches the mesh lane level, allowing for load distribution across the mesh lanes.

As detailed above, the circuits, devices, and systems described and/or illustrated herein broadly represent any type or form of computing device or system capable of executing computer-readable instructions, such as those contained within the modules described herein. In their most basic configuration, these computing device(s) each include at least one memory device and at least one physical processor.

In some examples, the term "memory device" generally refers to any type or form of volatile or non-volatile storage device or medium capable of storing data and/or computer-readable instructions. In one example, a memory device stores, loads, and/or maintains one or more of the modules and/or circuits described herein. Examples of memory devices include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, or any other suitable storage memory.

In some examples, the term "physical processor" generally refers to any type or form of hardware-implemented processing unit capable of interpreting and/or executing computer-readable instructions. In one example, a physical processor accesses and/or modifies one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), systems on a chip (SoCs), digital signal processors (DSPs), Neural Network Engines (NNEs), accelerators, graphics processing units (GPUs), portions of one or more of the same, variations or combinations of one or more of the same, or any other suitable physical processor.

In some implementations, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein are shown or discussed in a particular order, these steps do not necessarily need to be performed in the order illustrated or discussed. The various exemplary methods described and/or illustrated herein can also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components)

connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A device comprising:

a plurality of mesh lanes each corresponding to a memory channel interface; and a control circuit configured to:

receive a data packet based on an inter-device scheme that selected the device for reaching a destination of the data packet;

select, in response to identifying that forwarding the data packet to the destination uses at least one of the plurality of mesh lanes, a mesh lane of the plurality of mesh lanes based on an intra-device routing scheme; and forward the data packet to the selected mesh lane.

2. The device of claim 1, wherein a source of the data packet is outside of the device and the destination of the data packet is outside of the device.

3. The device of claim 2, wherein the selected mesh lane is selected based on a bandwidth availability of the selected mesh lane.

4. The device of claim 1, further comprising:

a plurality of ports;

wherein the data packet was forwarded to a port of the plurality of ports based on the inter-device routing scheme.

5. The device of claim 4, wherein the data packet is forwarded along the mesh lane to a second port of the plurality of ports.

6. The device of claim 5, wherein at the second port the inter-device routing scheme is applied to the data packet.

7. The device of claim 1, wherein a source of the received data packet is within the device.

8. The device of claim 7, wherein the selected mesh lane is selected based on a closest mesh lane to the source.

9. The device of claim 1, wherein a destination of the data packet is within the device.

10. The device of claim 9, wherein the selected mesh lane is selected based on a closest mesh lane to the destination.

11. A system comprising:

a first die comprising:

a first plurality of mesh lanes each corresponding to a memory channel interface; and a second die comprising:

a second plurality of mesh lanes each corresponding to a memory channel interface; and a control circuit configured to apply an inter-die routing scheme for data traffic outside the first die and the second die, and apply an intra-die routing scheme for data traffic within the first die or the second die.

12. The system of claim 11, wherein the control circuit is configured to apply the intra-die routing scheme for the first die by:

receiving, on a port of a first plurality of ports of the first die, a data packet;

selecting a mesh lane of the first plurality of mesh lanes based on an attribute of the data packet; and forwarding the data packet to the selected mesh lane via one or more of a first plurality of routing elements of the first die.

13. The system of claim 12, wherein a source of the data packet is outside of the first die, a destination of the data packet is the second die, and the selected mesh lane is selected based on the source or the destination.

14. The system of claim 12, wherein the data packet is forwarded along the mesh lane to a second port of the first plurality of ports and further forwarded to a third port of a second plurality of ports of the second die.

15. The system of claim 12, wherein the data packet is received at the port based on the inter-die routing scheme.

16. The system of claim 12, wherein a source of the received data packet is within the first die and the selected mesh lane is selected based on a closest mesh lane to the source.

17. The system of claim 12, wherein a destination of the received data packet is within the first die and the selected mesh lane is selected based on a closest mesh lane to the destination.

18. A method comprising:

determining, from an attribute of a data packet, a destination for the data packet to be sent across a die;

applying an intra-die routing scheme to select, based at least on the destination, a mesh lane of the die for sending the data packet across the die; and forwarding the data packet to the selected mesh lane using at least one routing element of the die.

19. The method of claim 18, wherein applying the intra-die routing scheme further comprises selecting the mesh lane based on a bandwidth availability of the selected mesh lane for the destination being outside of the die.

20. The method of claim 19, further comprising applying an inter-die routing scheme to the data packet outside of the die.

* * * * *